US 8,824,791 B2

(12) United States Patent
Brown et al.

(10) Patent No.: US 8,824,791 B2
(45) Date of Patent: Sep. 2, 2014

(54) COLOR CORRECTION FOR STATIC CAMERAS

(75) Inventors: Lisa M. Brown, Pleasantville, NY (US); Rogerio S. Feris, White Plains, NY (US); Sharathchandra U. Pankanti, Darien, CT (US); Kristina Scherbaum, Saarbruecken (DE)

(73) Assignee: International Business Machine Corporation, Armonk, NY (US)

( * ) Notice: Subject to any disclaimer, the term of this patent is extended or adjusted under 35 U.S.C. 154(b) by 466 days.

(21) Appl. No.: 13/097,435

(22) Filed: Apr. 29, 2011

(65) Prior Publication Data

US 2012/0274805 A1    Nov. 1, 2012

(51) Int. Cl.
G06K 9/00    (2006.01)
H04N 5/272    (2006.01)
H04N 9/73    (2006.01)
H04N 7/18    (2006.01)

(52) U.S. Cl.
CPC .............. *H04N 9/735* (2013.01); *H04N 5/272* (2013.01); *H04N 7/183* (2013.01)
USPC ........... 382/167; 382/103; 382/228; 382/173; 382/224

(58) Field of Classification Search
USPC .......................... 382/103, 167, 228, 173, 224
See application file for complete search history.

(56) References Cited

U.S. PATENT DOCUMENTS

| 8,280,165 | B2* | 10/2012 | Meng et al. | 382/173 |
| 2003/0194110 | A1* | 10/2003 | Brodsky | 382/103 |
| 2009/0110236 | A1* | 4/2009 | Huang et al. | 382/103 |
| 2009/0297023 | A1* | 12/2009 | Lipton et al. | 382/164 |
| 2011/0013836 | A1* | 1/2011 | Gefen et al. | 382/171 |
| 2011/0254950 | A1* | 10/2011 | Bibby et al. | 348/135 |

FOREIGN PATENT DOCUMENTS

| CN | 101443789 A | 5/2009 |
| CN | 101677351 A | 3/2010 |

OTHER PUBLICATIONS

Vaquero et al., "Attribute-Based People Search in Surveillance Environments", IEEE Workshop on Applications of Computer Vision, Snowbird, UT (2009).
Gallagher et al., "Clothing Cosegmentation for Recognizing People", IEEE Conf. on Computer Vision and Pattern Recognition, Anchorage, AK (2008).
Hirakawa et al., "Chromatic Adaptation and White Balance Problem", IEEE Int'l Conf. on Image Processing (2005).
Ilie et al., "Ensuring Color Consistency Across Multiple Cameras", Int'l. Conf. on Computer Vision (2005).

(Continued)

*Primary Examiner* — Jayesh A Patel
(74) *Attorney, Agent, or Firm* — Ryan, Mason & Lewis, LLP

(57) ABSTRACT

Methods and apparatus are provided for color correction of images. One or more colors in an image obtained from a static video camera are corrected by obtaining one or more historical background models from one or more prior images obtained from the static video camera; obtaining a live background model and a live foreground model from one or more current images obtained from the static video camera; generating a reference image from the one or more historical background models; and processing the reference image, the live background model, and the live foreground model to generate a set of color corrected foreground objects in the image. The set of color corrected foreground objects is optionally processed to classify a color of at least one of the foreground objects.

20 Claims, 2 Drawing Sheets

(56) References Cited

OTHER PUBLICATIONS

Sanders et al., "Class-specific Color Camera Calibration and Application to Object Recognition", IEEE Workshop on Applications of Computer Vision (2005).

Renno et al., "Application and Evaluation of Colour Constancy in Visual Surveillance", Proc. 2nd Joint IEEE Int'l Workshop on VS-PETs, pp. 301-308 Beijing (2005).

Manduchi et al., "Learning Outdoor Color Classification", IEEE Trans. on Pattern Analysis and Machine Intelligence, vol. 28, No. 11, pp. 1713-1723 (2006).

Schaefer et al., "A Combined Physical and Statistical Approach to Colour Constancy", IEEE Conf. of Computer Vision and Pattern Recognition (2005).

Tsin et al., "Bayesian Color Constancy for Outdoor Object Recognition", IEEE CVPR (2001).

Wui et al., "Identifying Color in Motion in Video Sensors", Proc. IEEE CVPR (2006).

* cited by examiner

COLOR CORRECTION FOR STATIC CAMERAS

FIELD OF THE INVENTION

The present invention relates generally to digital video surveillance, video event retrieval and video processing, and, more particularly, to color correction techniques.

BACKGROUND OF THE INVENTION

Surveillance systems typically can preemptively warn security officers of potential threats and/or facilitate investigations of critical occurrences. For the latter capability, security personnel must proactively and forensically search video images for pertinent people or events. In practice, information regarding the appearance of a person or vehicle is often limited to characteristics that lack the permanence to identify the object uniquely and reliably. However, in the real world, such information can be very effective in pruning the search and helping to find the object, especially when used with other information.

When identifying people, such characteristics are often called "soft biometrics." One of the most important soft biometrics is clothing color, since it is easy to observe and remember and feasible to extract from video images. Similarly, for identifying vehicles, color is often the only feasible cue. Thus, for many surveillance applications, color information can permit a user to find the significant event. For example, when following up on a report of a suspicious activity (e.g., locating a vehicle of a particular make, model and color that is involved in an incident) or when performing retail surveillance (e.g., associating a customer who took an item from a store with his or her exit) color information may assist the identification.

Identifying object color is a challenging problem because of the challenges of color constancy. For example, when looking at a full image of an object in context, the perceived (and true) color of the object may appear to be green. When a portion of the image of the object is isolated (e.g., extracting an unchanged portion of the full image), however, it may actually be composed of pixels of another color. For example, green pixels extracted from a full image may appear to as gray pixels or blue pixels in the isolated extracted portion. The pixels may "appear" green in the full scene because humans unconsciously observe that the scene has a red "cast" and compensate correctly to perceive green, the true reflectance of the object. Similarly, images from the same camera at a different time of day, or under different lighting conditions, may be perceived by a human to be another color and be composed of entirely different color pixels.

A need therefore exists for improved methods and apparatus for color correction of images.

SUMMARY OF THE INVENTION

Generally, methods and apparatus are provided for color correction of images. According to one aspect of the invention, one or more colors in an image obtained from a static video camera are corrected by obtaining one or more historical background models from one or more prior images obtained from the static video camera; obtaining a live background model and alive foreground model from one or more current images obtained from the static video camera; generating a reference image from the one or more historical background models; and processing the reference image, the live background model, and the live foreground model to generate a set of color corrected foreground objects in the image.

The set of color corrected foreground objects is optionally processed to classify a color of at least one of the foreground objects, for example, using a color quantization classification method or a histogram color classification method.

The reference image can be a linear combination of the historical background models that substantially optimally approximates a scene under diffuse white lighting. The reference image can be substantially optimized locally to compensate for local lighting and shadows.

In one implementation, the reference image, the live background model, and the live foreground model are processed by applying one or more color correction algorithms locally to substantially optimize a mapping from the reference image to the live background model. For example, the mapping can be applied to the live foreground model to obtain the set of color corrected foreground objects in the image.

A more complete understanding of the present invention, as well as further features and advantages of the present invention, will be obtained by reference to the following detailed description and drawings.

DETAILED DESCRIPTION OF PREFERRED EMBODIMENTS

Figure 1:
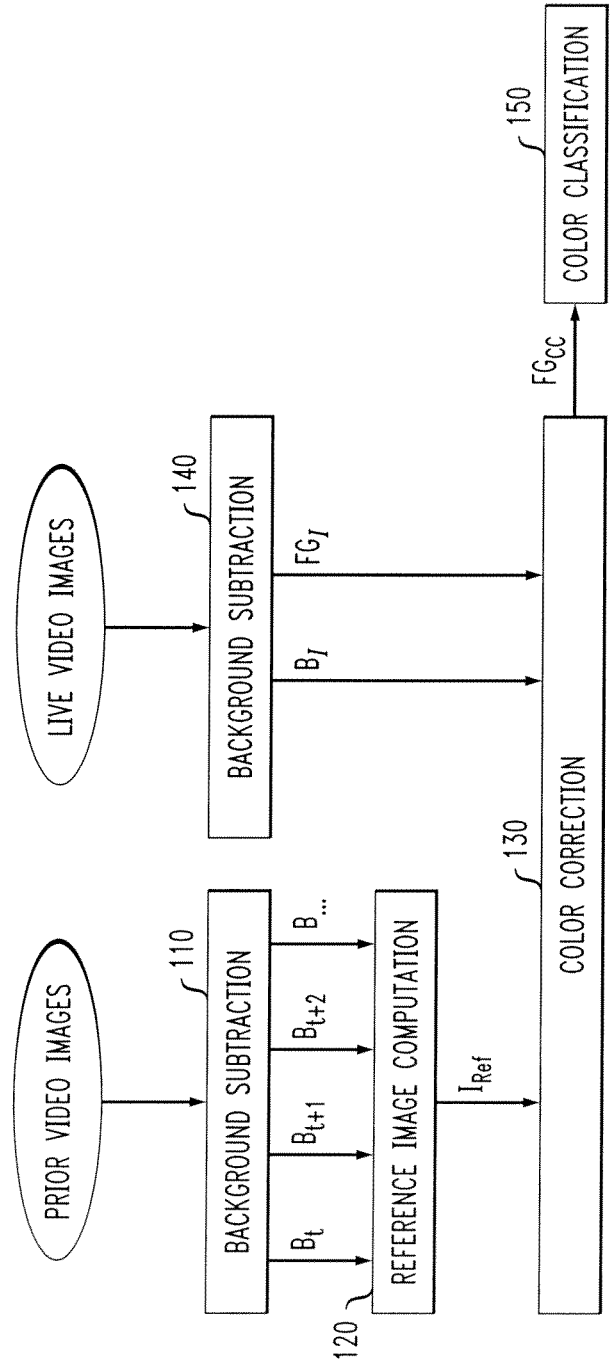
FIG. 1 is a flow chart describing an exemplary implementation of a color correction process incorporating features of the present invention.

The present invention provides improved methods and apparatus for color correction of images. According to one aspect of the invention, chromatic adaptation algorithms are provided that perform color correction based on the recognition that the camera is static and background models are available. The disclosed chromatic adaptation algorithms compensate for the effects of illumination and recover the true reflectance of objects.

Chromatic Adaptation Techniques

1. White Patch

Based on the Retinex algorithm, color constancy can be achieved independently using three different wavebands, in practice: red, green, blue. See, e.g., "The Retinex Theory of Color Vision" Sci. Am. 237:108-28. Reprinted in McCann, Vol. III, 125-42 (1977). Assume a single global uniform illuminant, and that there exists objects in the scene that will reflect the maximum of each color. Thus, the Retinex theory suggests that the illuminant is $(r_{max}, g_{max}, b_{max})$ and that by normalizing each pixel by this illuminant, color constancy can be achieved. This method is often called the white patch algorithm, since the brightest patch in the image is assumed to be white.

2. Gray World

Under the gray world algorithm, it is assumed that the average of the spatial reflectance in a scene is achromatic. In this case, normalization is based on the ratio of the means $(\mu^C_r/\mu^U_r, \mu^C_g/\mu^U_g, \mu^C_b/\mu^U_b)$ where the superscripts C and U represent the canonical and unknown illuminant, respectively. For example, the gray world method may normalize to recover reflectance independent of illuminant, and then quantize into a predefined number of colors, to recover an object of a particular color.

3. Gray Edge

The gray-edge method has been shown to be very promising for complex natural scenes while also being very efficient. See, e.g., J. van de Weijer et al., "Edge-Based Color Constancy," IEEE Trans. on Image Processing, Vol. 16, No. 9, September 2007. The gray-edge method is based on the gray-edge hypothesis which assumes the average edge difference in a scene is achromatic. For the gray-edge color correction, the Sobel filter is applied per channel. The gradient magnitude is used, as follows:

$$\nabla_r|(i,j)|=|\partial_{r,x}(i,j)|+|\partial_{r,y}(i,j)|$$

$$\nabla_g|(i,j)|=|\partial_{g,x}(i,j)|+|\partial_{g,y}(i,j)|$$

$$\nabla_b|(i,j)|=|\partial_{b,x}(i,j)|+|\partial_{b,y}(i,j)|$$

to determine a weighting factor so that strong edges were given more emphasis. The weighted average of the edge pixels $(r_a, g_a, b_a)$ is computed. Each pixel of the input channel $(r_{i,j}, g_{i,j}, b_{i,j})$ was then scaled by:

$$\left(\frac{r_{i,j}}{r_a+\varepsilon}, \frac{g_{i,j}}{g_a+\varepsilon}, \frac{b_{i,j}}{b_a+\varepsilon}\right).$$

In an exemplary implementation, $\epsilon=0.128$ to prevent the normalized r, g, b values from exceeding the color domain when divided by very small numbers.

Both gray world and gray edge techniques require a canonical image representing the scene under uniform white lighting. In practice, this image may not be available. J. P. Renno et al., "Application and Evaluation of Colour Constancy in Visual Surveillance," Proc. $2^{nd}$ Joint IEEE Int'l Workshop on VS-PETS, Beijing, October 15-16, 301-308 (2005), proposed and tested several methods to select a canonical image based on various metrics used to find the image with the greatest range of colors.

Similarly, for both gray world and gray edge methods, accurate color correction depends on the content of the image relative to the canonical image. In live video, the content of the scene will change over time as objects (people and vehicles) move into the foreground. It is important therefore, to perform chromatic adaption for the current image based on the lighting of the background model. In practice, the best we can do is use the most recent background model. These methods are identified as "with Background model."

Finally, intensity normalization allows quantization (particularly into black and white) to be adaptive to scene brightness and time of day. Intensity normalization can be performed prior to color correction. Each pixel value is normalized based on the sample image mean and variance for each channel.

$$\begin{pmatrix} r' \\ g' \\ b' \end{pmatrix} = \begin{pmatrix} \frac{r-\mu_R}{\sigma_R} \\ \frac{g-\mu_G}{\sigma_G} \\ \frac{b-\mu_B}{\sigma_B} \end{pmatrix}$$

After color correction, normalization can be performed again so that the average intensity remains in the same range.

FIG. 1 is a flow chart describing an exemplary implementation of a color correction process 100 incorporating features of the present invention. As shown in FIG. 1, the exemplary color correction process 100 initially performs a background subtraction during step 110 using a number of prior (historical) video images. In addition, the exemplary color correction process 100 also performs a background subtraction during step 140 using a number of live (or real-time) video images.

Generally, the background subtractions performed during steps 110 and 140 process a video input (for example, from a digital video camera input) and generate a background model. A background model is an image containing the objects that do not move in the scene. For example, a background model may be comprised of the road, buildings, sky and other immobile objects. Once a vehicle is parked, if it doesn't move, it becomes part of the updated background model.

There are a number of well-known methods to detect moving objects, such as people and vehicles, in a scene. For example, moving object detection can be performed using image differencing, Multi-Gaussian Mixture Models (see, e.g., C. Stauffer and W. E. L. Grimson, "Adaptive Background Mixture Models for Real-Time Tracking," IEEE Computer Society Conference on Computer Vision and Pattern Recognition, Vol. 2, 1999), Kernel Density Methods (see, e.g., A. Elgammal et al., "Non-Parametric Model for Background Subtraction," 6th European Conf. on Computer Vision, Dublin, Ireland, June/July 2000) and Mean Shift techniques (B. Han et al., "Incremental Density Approximation and Kernel-Based Bayesian Filtering for Object Tracking," IEEE Conf. on Computer Vision and Pattern Recognition, Washington D.C., 2004).

As shown in FIG. 1, the output of the background subtraction performed during step 110 comprises a number of historical outputs (Bt). The Bt outputs are the historical background models over time, that were generated by the system. In an ideal case, a background model is desired that contains the same static objects as the current frame. That is, if a car parked and changed the background, the current background (the car) is of interest historically, and not the scene behind the car. Generally, the change in lighting over time is used, as witnessed on the same static scene.

As shown in FIG. 1, the output of the background subtraction performed during step 140 comprises a live background model, $B_l$, and a live foreground model, $FG_l$. The foreground model, $FG_l$, is an image containing the moving objects in the scene.

As shown in FIG. 1, the Bt outputs from step 110 are processed during step 120 by a reference computation process, as discussed further below in conjunction with FIG. 2, to generate a reference image, $I_{ref}$. The reference image, $I_{ref}$, is then processed, together with the live background model, $B_l$, and live foreground model, $FG_l$, generated by the background subtraction performed during step 140, during step 130 to generate a foreground color correction, $FG_{CC}$. The foreground color correction, $FG_{CC}$, is processed during step 150 to classify the color, as discussed further below in conjunction with FIG. 3.

Figure 2:
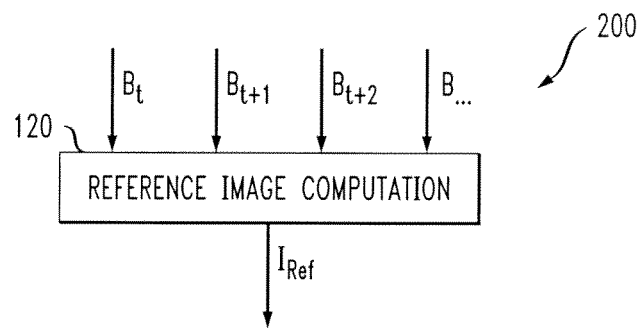
FIG. 2 illustrates the reference image computation of FIG. 1 in further detail.

FIG. 2 illustrates the reference image computation 120 of FIG. 1 in further detail. The exemplary reference image computation 120 employs an assumption that lighting conditions are additive. The reference image computation 120 finds a reference image as a linear combination of background models which is closest to "white" lighting, optimizing locally to compensate for local lighting and shadows. As shown in FIG. 1, the reference image computation 120 processes a sequence of historical background models ($B_t$, $B_{t+1}$, $B_{t+2}$) obtained during step 110 (FIG. 1). The reference image computation 120 generates the reference image ($I_{Ref}$) with local lighting patches identified.

The computation of the color correction in accordance with the present invention depends on a reference image ($I_{Ref}$). In an ideal case, this reference image ($I_{Ref}$) represents what the reflectance (color) of the object would look like under diffuse white lighting. A reference image is desired for the current background model. Thus, the inputs are the historical background models. It is assumed that lighting conditions are additive. A reference image is found that is a linear combination of background models that is closest to "white" lighting. A weighted combination of background models is determined that optimizes a measure of the "whiteness" of the lighting. Different measures can be used, such as a measure of "colorfulness" based on the statistics of the color distribution (since under white lighting there is likely to be the greatest range of colors) or the most pure colors, colors at the extrema of the color gamut on or near the plane luminance.

Additionally, to the extent that enough information (resolution and history) is available, this optimization can be performed locally so that it is possible to compensate for local lighting and shadows.

Figure 3:
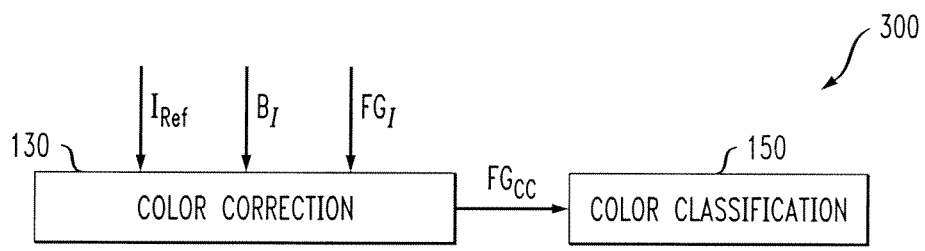
FIG. 3 illustrates the color correction and color classification of FIG. 1 in further detail.

FIG. 3 illustrates the color correction 130 and color classification 150 of FIG. 1 in further detail. As shown in FIG. 3, the color correction 130 processes the reference image ($I_{Ref}$) computed at step 120, as well as the live background model, $B_t$, and live foreground model, $FG_t$, generated by the background subtraction performed during step 140. The color correction 130 generates a set of color corrected foreground objects, $FG_{CC}$.

The exemplary color correction 130 applies well-known color correction algorithms locally in order to optimize mapping to the reference image ($I_{Ref}$). For example, the exemplary color correction 130 can apply known color correction algorithms, such as the Gray world, white patch or gamut mapping techniques described above. The color correction 130 computes a mapping from the reference image ($I_{Ref}$) to the live (or current) background model, $B_t$. This mapping is applied to the live (or current) foreground objects, $FG_t$, (the objects of interest) to obtain their corrected coloration.

The exemplary color classification 150 processes the set of color corrected foreground objects, $FG_{CC}$, generated by the color correction 130. The exemplary color classification 150 generates the colors of each object in the set of color corrected foreground objects, $FG_{CC}$. Generally, the exemplary color classification 150 performs color classification of the object using the color corrected pixels. This color classification might entail color quantization and histogramming, or may be more complex and entail some kind of object color model, as would be apparent to a person of ordinary skill in the art.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
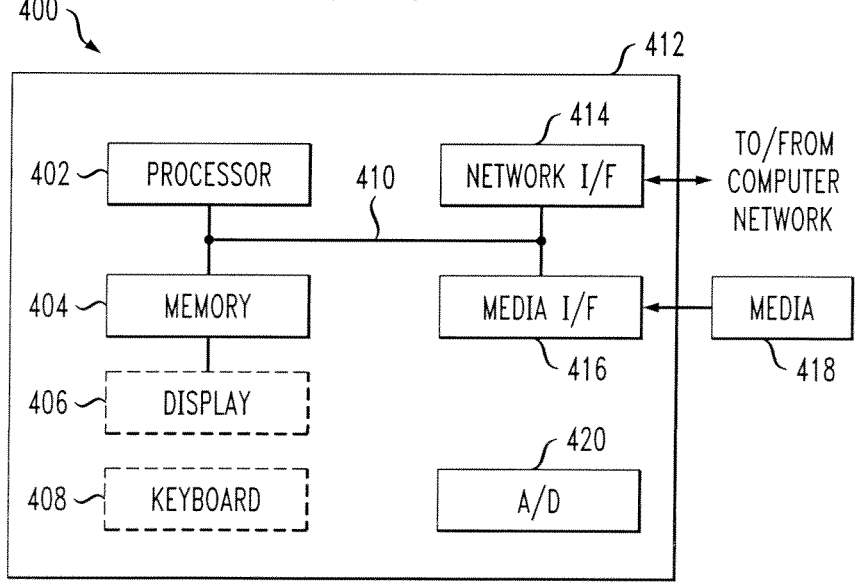
FIG. 4 depicts a computer system that may be useful in implementing one or more aspects and/or elements of the present invention.

One or more embodiments can make use of software running on a general purpose computer or workstation. FIG. 4 depicts an exemplary computer system 400 that may be useful in implementing one or more aspects and/or elements of the present invention. With reference to FIG. 4, such an implementation might employ, for example, a processor 402, a memory 404, and an input/output interface formed, for example, by a display 406 and a keyboard 408.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Analog-to-digital converter(s) 420 may be provided to receive analog input, such as analog video feed, and to digitize same. Such converter(s) may be interconnected with system bus 410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 402. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for correcting one or more colors in an image obtained from a static video camera, comprising:
   obtaining one or more historical background models from one or more prior images obtained from said static video camera;
   obtaining a live background model and a live foreground model from one or more current images obtained from said static video camera;
   generating a reference image from said one or more historical background models; and
   generating a set of color corrected foreground objects in said image by processing said reference image, said live background model, and said live foreground model.

2. The method of claim 1, wherein said reference image is a linear combination of said historical background models that substantially optimally approximates a scene under diffuse white lighting.

3. The method of claim 1, wherein said reference image is substantially optimized locally to compensate for local lighting and shadows.

4. The method of claim 1, wherein said processing step further comprises the step of applying one or more color correction algorithms locally to substantially optimize a mapping from said reference image to said live background model.

5. The method of claim 4, wherein said mapping is applied to said live foreground model to obtain said set of color corrected foreground objects in said image.

6. The method of claim 1, further comprising the step of processing said set of color corrected foreground objects to classify a color of at least one of said foreground objects.

7. The method of claim 6, wherein said color of at least one of said foreground objects is classified using one or more of a color quantization color classification method and a histogram color classification method.

8. An apparatus for correcting one or more colors in an image obtained from a static video camera, said apparatus comprising:
   a memory; and
   at least one processor, coupled to the memory, operative to:
      obtain one or more historical background models from one or more prior images obtained from said static video camera;
      obtain a live background model and a live foreground model from one or more current images obtained from said static video camera;
      generate a reference image from said one or more historical background models; and
      generate a set of color corrected foreground objects in said image by processing said reference image, said live background model, and said live foreground model.

9. The apparatus of claim 8, wherein said reference image is a linear combination of said historical background models that substantially optimally approximates a scene under diffuse white lighting.

10. The apparatus of claim 8, wherein said reference image is substantially optimized locally to compensate for local lighting and shadows.

11. The apparatus of claim 8, wherein said reference image, said live background model, and said live foreground model are processed by applying one or more color correction algorithms locally to substantially optimize a mapping from said reference image to said live background model.

12. The apparatus of claim 11, wherein said mapping is applied to said live foreground model to obtain said set of color corrected foreground objects in said image.

13. The apparatus of claim 8, wherein said processor is further configured to process said set of color corrected foreground objects to classify a color of at least one of said foreground objects.

14. The apparatus of claim 13, wherein said color of at least one of said foreground objects is classified using one or more of a color quantization color classification method and a histogram color classification method.

15. An article of manufacture for correcting one or more colors in an image obtained from a static video camera, comprising a non-transitory machine readable recordable storage medium containing one or more programs which when executed implement the step of:
   obtaining one or more historical background models from one or more prior images obtained from said static video camera;
   obtaining a live background model and a live foreground model from one or more current images obtained from said static video camera;
   generating a reference image from said one or more historical background models; and
   generating a set of color corrected foreground objects in said image by processing said reference image, said live background model, and said live foreground model.

16. The article of manufacture of claim 15, wherein said reference image is a linear combination of said historical background models that substantially optimally approximates a scene under diffuse white lighting.

17. The article of manufacture of claim 15, wherein said reference image is substantially optimized locally to compensate for local lighting and shadows.

18. The article of manufacture of claim 15, wherein said processing step further comprises the step of applying one or more color correction algorithms locally to substantially optimize a mapping from said reference image to said live background model.

19. The article of manufacture of claim 18, wherein said mapping is applied to said live foreground model to obtain said set of color corrected foreground objects in said image.

20. The article of manufacture of claim 15, further comprising the step of processing said set of color corrected foreground objects to classify a color of at least one of said foreground objects.

* * * * *